United States Patent
Kim et al.

(10) Patent No.: US 9,128,566 B2
(45) Date of Patent: Sep. 8, 2015

(54) ACOUSTIC PULSE RECOGNITION WITH INCREASED ACCURACY BY LOCALIZING CONTACT AREA OF PLATE

(71) Applicant: ACS Co., Ltd., Daegu (KR)

(72) Inventors: Jee Hoon Kim, Cupertino, CA (US); Hyoung Sup Shin, Seongnam-Si (KR)

(73) Assignee: ACS CO., LTD., Daegu (KR)

( * ) Notice: Subject to any disclaimer, the term of this patent is extended or adjusted under 35 U.S.C. 154(b) by 11 days.

(21) Appl. No.: 13/781,141

(22) Filed: Feb. 28, 2013

(65) Prior Publication Data

US 2014/0240296 A1     Aug. 28, 2014

(51) Int. Cl.
*G06F 3/043*     (2006.01)
*G06F 3/02*     (2006.01)

(52) U.S. Cl.
CPC ............ *G06F 3/0433* (2013.01); *G06F 3/0202* (2013.01)

(58) Field of Classification Search
CPC ...................... G06F 3/0433; G06F 3/02–3/027
USPC ............................ 178/18.04, 19.02; 345/177
See application file for complete search history.

(56) References Cited

U.S. PATENT DOCUMENTS

| | | | |
|---|---|---|---|
| 6,928,181 B2 | 8/2005 | Brooks | |
| 8,314,775 B2 | 11/2012 | Westerman et al. | |
| 2001/0006006 A1* | 7/2001 | Hill | ................................. 73/606 |
| 2005/0212777 A1* | 9/2005 | Ing et al. | ....................... 345/173 |
| 2007/0070046 A1* | 3/2007 | Sheynblat et al. | ............ 345/173 |
| 2010/0079398 A1 | 4/2010 | Shen et al. | |
| 2012/0235935 A1* | 9/2012 | Ciesla et al. | .................. 345/173 |
| 2013/0229351 A1 | 9/2013 | Whitt et al. | |

OTHER PUBLICATIONS

PCT International Search Report and Written Opinion, PCT Application No. PCT/US2014/010076, May 7, 2014, ten pages.

* cited by examiner

*Primary Examiner* — Michael Pervan
(74) *Attorney, Agent, or Firm* — Fenwick & West LLP

(57) ABSTRACT

A keypad with a plate and distinct keys that move relative to the plate to generate an acoustic signal for acoustic pulse recognition (APR). Each key represents an input value and is structured to contact the plate at a region smaller than an upper surface of the key where a finger or a thumb comes into touch. The contact region of the plate coming into contact with an individual key is small relative the upper surface of the key, and hence, acoustic signals generated in response to the touch of the same key has less variance compared to acoustic signals generated in response to a direct touch of the plate by a finger or a thumb. As a result, the localization of the touch using APR can be more accurate compared to direct touch of the plate by a figure or a thumb.

5 Claims, 4 Drawing Sheets

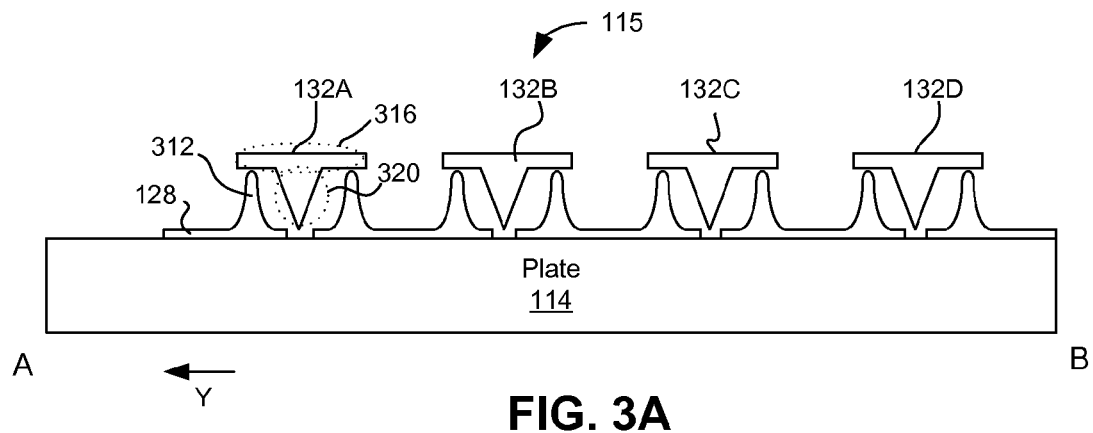
FIG. 3A
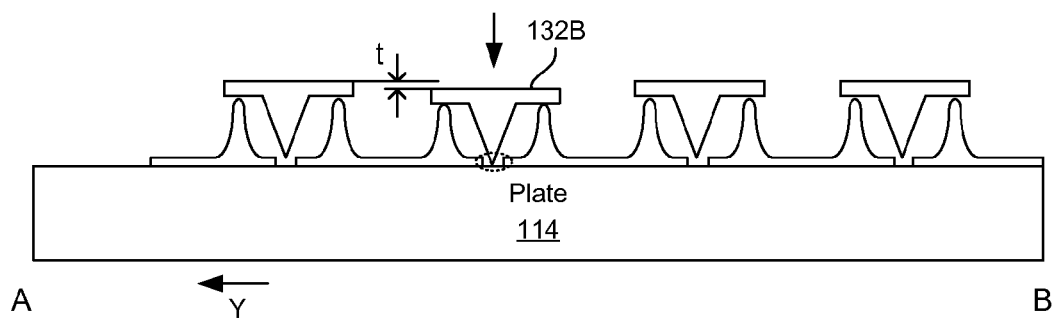
FIG. 3B
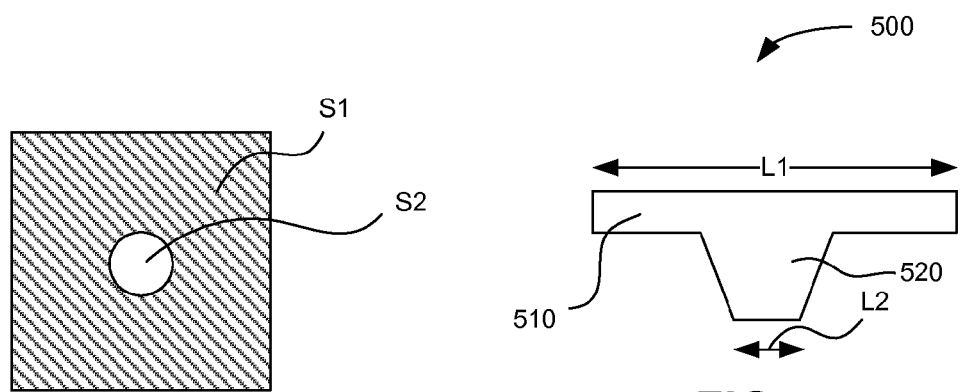
FIG. 4
FIG. 5

ACOUSTIC PULSE RECOGNITION WITH INCREASED ACCURACY BY LOCALIZING CONTACT AREA OF PLATE

BACKGROUND

1. Field of Disclosure

This disclosure relates generally to acoustic pulse recognition for sensing and localizing touches on a surface, and more specifically to using keys to limit contact areas on the surface for generating an acoustic signal.

2. Description of the Related Art

Acoustic pulse recognition (APR) determines the location of a touch on a surface by detecting and processing acoustic signals generated as a result of the touch. Acoustic signals of different wave patterns are generated when different parts of the surface are touched. Hence, by analysing an acoustic signal generated in response to a touch of the surface, the location of the touch can be determined. One way of analysing the acoustic signal includes storing reference acoustic signals generated in response to touching multiple reference points of the surface during a calibration stage, and then comparing the stored reference acoustic signal with an acoustic signal generated in response to touching of an unspecified location of the surface during an operational stage. Extrapolation or interpolation may be made based on the reference acoustic signals to approximate the unspecified location of the touch at the touch associated with the generated acoustic signal.

There are several ways to improve the accuracy of the localization in APR. One way is to increase the number of sensors for detecting the acoustic signal. By using more acoustic signals, ambiguity on the touched location can be reduced. Specifically, some geometric configuration of the touched surface may cause the same or a similar acoustic signal to be detected at a sensor even when different locations of the surface are touched. But another sensor placed in a different location or in a different orientation may detect distinct acoustic signals under such circumstances. Hence, adding sensors may resolve the issue associated with touches on different locations causing the same acoustic signal. Another way of increasing the accuracy is to increase the number of reference points and corresponding number of reference acoustic signals stored for comparison in the operation stage. However, such increased number of sensors or reference points leads to increased cost and processing requirements.

Moreover, these solutions do not completely eliminate the ambiguity associated with acoustic signals generated, especially, when a touch is made around border areas of each region of the surface associated with a different input value. Assume, for example, that two regions of the surface associated with two different input values are adjacent to each other. If a user touches the border area of the two regions, the acoustic pulse generated in response may cause random selection between the two input values, which may not always reflect the user's intended choice of input. Such unintended input in conjunction with the lack of tactile feedback may exacerbate user experience associated with a user input device using APR.

SUMMARY

Embodiments relate to a user input device using acoustic pulse recognition that includes a plurality of keys that come into contact with a plate to make distinctive acoustic signals when a key is pressed. Each key includes a touch surface configured to receive a touch from a user in a raised position. A portion of each key moves to a lowered position and comes into contact with a contact region of a plate when the key is touched. Such contact generates an acoustic signal. The acoustic signal is detected and converted into a sensor signal by at least one sensor. The sensor signal is then processed to determine which one of the keys was pressed.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 3A is a sectional view of a keypad of the APR system of FIG. 1 when no key is pressed, according to one embodiment.

FIG. 3B is a sectional view of a keypad of the APR system of FIG. 1 when a key is pressed, according to one embodiment.

FIG. 4 is a conceptual diagram illustrating the relationship between a region of a key that can be touched and a contact region on the surface of a plate where an acoustic signal can be generated, according to one embodiment.

FIG. 5 is a sectional diagram illustrating a structure of a key according to another embodiment.

DETAILED DESCRIPTION OF THE EMBODIMENTS

Figure 1:
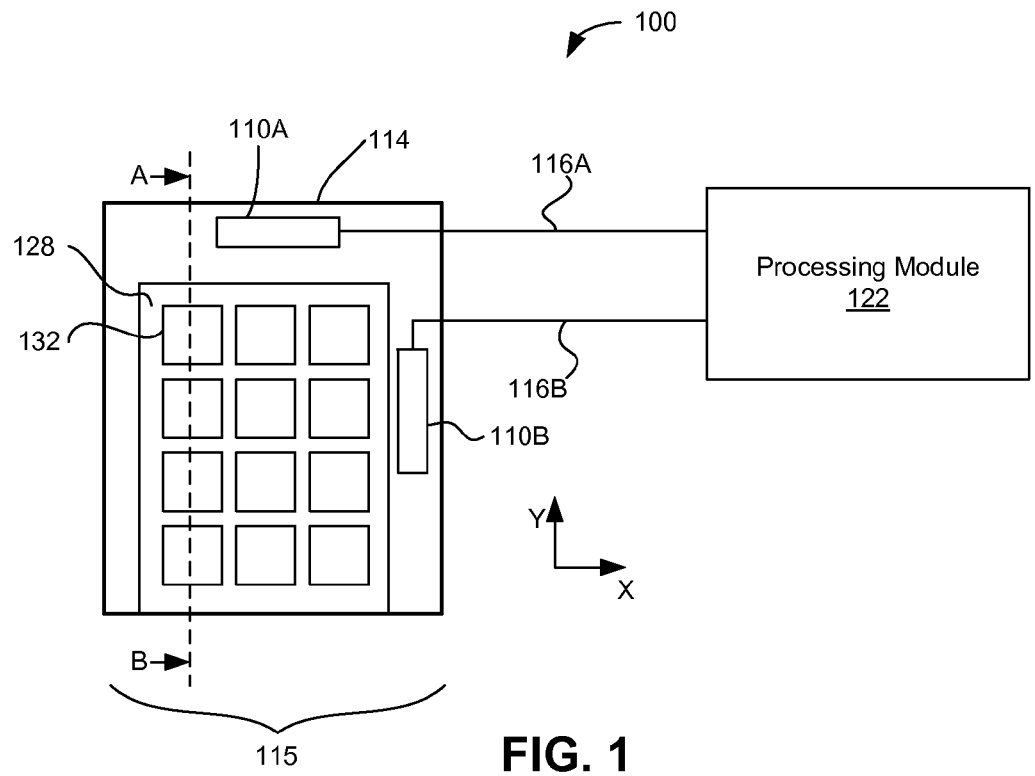
FIG. 1 is a block diagram illustrating an acoustic pulse recognition (APR) system, according to one embodiment.

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments.

In the drawings, like reference numerals in the drawings denote like elements. The shape, size and regions, and the like, of the drawing may be exaggerated for clarity.

Embodiments relate to providing keypads with a plate and distinct keys that move relative to the plate to generate an acoustic signal for acoustic pulse recognition (APR). Each key represents an input value and is structured to contact the plate at a region smaller than an upper surface of the key where a finger or a thumb comes into touch. The contact region of the plate coming into contact with an individual key is small relative the upper surface of the key, and hence, acoustic signals generated in response to the touch of the same key has less variance compared to acoustic signals generated in response to a direct touch of the plate by a finger or a thumb. As a result, the localization of the touch using APR can be more accurate compared to direct touch of the plate by a finger or a thumb. Moreover, tactile feedback is provided for each touch to enhance user experience.

Architecture of Acoustic Pulse Recognition System

FIG. 1 is a block diagram illustrating an acoustic pulse recognition (APR) system 100, according to one embodiment. The APR system 100 may include two main parts: a keypad 115 and a processing module 122. The keypad 115 and the processing module 122 may be separate. Alternatively, the keypad 115 and the processing module 122 may be integrated into a single body. In either case, the keypad 115 and the processing module 122 communicate via wires 116A, 116B.

The keypad 115 generates sensor signals responsive to a user's touch. The sensor signals are transmitted to the processing module 122 via the wires 116A, 116B. The keypad 115 may include, among other components, a plate 114, sensors 110A, 110B, keys 132, and a resilient cover 128. The keys 132 move relative to the plate 114 when the keys 132 are touched by the user. When a key 132 is pressed, the pressed key 132 comes into contact with a contact region of the plate 114, causing an acoustic signal to propagate throughout the plate 114. Depending on where the contact occurred on the plate 114, the acoustic signal has a different waveform and characteristics. APR uses such distinction in the waveform and characteristics to determine where the contact occurred on the plate 114.

The resilient cover 128 is placed between the plate 114 and the keys 132 to revert the keys 132 back to the raised position when the user's touch is removed, as described below in detail with reference to FIGS. 3A and 3B. The resilient cover 128 may be made of rubber, silicon or other resilient material. Further, instead of using the resilient cover 128, spring or other structures may be used to return the keys 132 back to the raised position.

In the embodiment of FIG. 1, twelve keys 132 are provided on the keypad 115. Each key represents a different value. For example, each of the keys may represent a numerical value of zero (0) through nine (9), a pound (#) sign or a star (*) sign. More keys or fewer keys may be provided depending on the application of the APR system 100.

The sensors 110A, 110B may be embodied, for example, as a strain gauge or a piezo sensor. The sensor 110A and the sensor 110B are placed in different locations of the plate 114 and may be oriented in a different direction. In one embodiment, the sensors 110A is oriented in X direction, and the sensor 110B is oriented in Y direction that is perpendicular to X direction. The acoustic signal generated in response to pressing of a key 312 is detected by each of the sensors 110A, 110B and converted into the sensor signals. Due to the difference in the location and orientation of the sensors 110A, 110B, the two sensor signals generated at the sensors 110A, 110B are distinctive even when the same location of the plate 114 comes into contact with the keys 132. The sensor signals are transmitted via the wires 116A, 116B to the processing module 122. Although only two sensors 110A, 110B are illustrated in FIG. 1, more than two sensors or a single sensor may be used. Further, the sensors may be oriented in different directions and with different angles. For example, the sensors may be oriented with 45 degrees difference.

The plate 114 may be any material that is rigid and robust enough to repetitively receive striking of the keys 132 and other structures (e.g., keys 132 and the sensors 110A, 110B). The plate 114 may be transparent depending upon application. In one embodiment, the plate 114 is embodied as a plastic or a glass.

Figure 2:
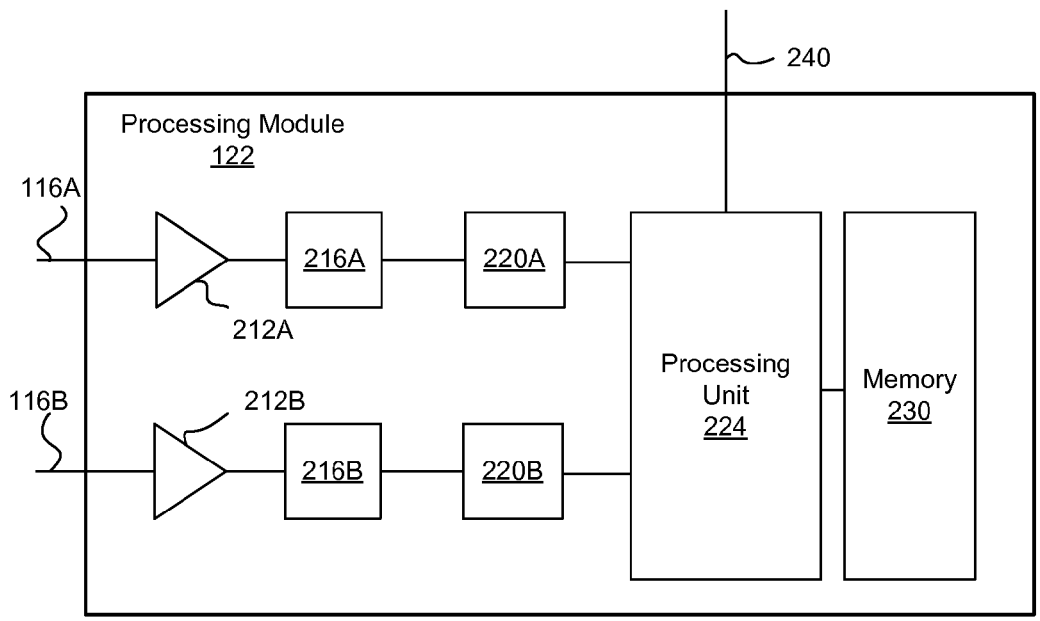
FIG. 2 is a block diagram illustrating a processing module of the APR system of FIG. 1, according to one embodiment.

FIG. 2 is a block diagram illustrating a processing module 122 of the APR system 100 of FIG. 1, according to one embodiment. The processing module 122 is hardware, software, firmware or a combination thereof for processing the sensor signal received via the wires 116A, 116B to determine which key was pressed by the user. The processing module 122 may include, among other components, amplifiers 212A, 212B, filters 216A, 216B, analog-to-digital converters (ADC) 220A, 220B, a processing unit 224 and memory 230.

The amplifiers 212A, 212B are connected to the wires 116A, 116B, respectively, to receive the sensor signals corresponding to the acoustic signals. The received sensor signals are amplified by the amplifiers 212A, 212B and then fed to the filters 216A, 216B to remove noise from the amplified signals. In one embodiment, filters 216A, 216B are implemented as notch filters or band-pass filters. The ADCs 220A, 220B convert the filtered signal into digital signals for processing at the processing unit 224.

In a calibration mode, predetermined keys 132 are pressed and the sensor signals corresponding to the pressing of the keys 132 are detected for storage as reference signals. The reference signals in association with the pressed keys are stored in the memory 230. A reference signal may be represented in a time-domain waveform or a frequency-domain waveform.

In an operational stage after the calibration stage, each of the digital signals received from the ADCs 220A, 220B are compared with each of the stored reference signals to determine the closest reference signals. That is, the digital signal generated based on an acoustic signal detected at the sensor 110A is compared with the reference signals of the sensor 110A stored in the memory 230. Similarly, the digital signal generated based on an acoustic signal detected at the sensor 110B is compared with the reference signals of the sensor 110B stored in the memory 230. In one embodiment, a cross correlation function is used by the processing unit 224 to compare the similarity between of the stored reference signals and the digital signals received in the operational stage. If both cross correlation values for a certain key exceed a threshold value, then it is determined that the certain key was pressed.

If only a subset of keys were pressed during the calibration stage, the processing unit 224 may perform interpolation or extrapolation based on the stored reference signals to determine pressing of other keys not pressed in the calibration stage.

After the pressed key is determined in the operational stage, the processing unit 224 sends the identification of the pressed key to another device via an output line 240.

The processing module 122 and the process of determining the pressed key described herein are merely illustrative. Various changes may be made to the processing module 122 and the process. For example, instead of using two ADCs 220A, 220B, a single ADC may convert both electric signals carried over the wires 116A, 116B. Further, the signals from the two sensors 110A, 110B can be combined into a single signal for storing as a reference signal or comparison with a reference signal. For example, the processing technique as disclosed in U.S. Patent Application Publication No. 2011/0137968 entitled "Method for Determining the Position of Impacts," which is incorporated by reference herein in its entirety, may be used to process the sensor signals.

Example Structures of Keypad

Contrary to a conventional APR system, the keypad 115 according to embodiments includes keys 132 that localize the contact regions of the plate 114 where the keys 132 strike the plate 114. By localizing the contact regions on the plate 114, the keys pressed by a user can be determined more accurately since the limited contact regions results in acoustic signals with less variation. Further, since the keys 132 are discrete and clearly distinguishable, a user is unlikely to touch border regions between the keys which may cause an ambiguous input. Even if the user touches the border regions, one key is likely to strike the plate 114 from the other key. Hence, the ambiguity associated with touching border regions of two different touch regions in APR system is eliminated by the use of keys. The tactile feedback caused by striking of the keys 132A against the surface of the plate 114 also enhances user experience by providing assurance that the keys 132A were pressed.

FIG. 3A is a sectional view of the keypad 115 of the APR system 100 taken along line A-B of FIG. 1, according to one embodiment. A column of keys 132A through 132D are shown in FIG. 3A. The resilient cover 128 is placed between the plate 114 and the keys 132A through 132D. The resilient cover 128 includes bumps 312 that are secured to the keys 132A through 132D.

When the keys are not pressed (as in FIG. 3A), the bumps 312 of the resilient cover 128 support the keys 132A through 132 D and prevent the keys 132A through 132D from coming into touch with the plate 114.

Each key includes two parts: a touch portion 316 and a strike portion 320. The touch portion 316 is a portion of the key that is pressed by a finger or a thumb to cause a vertical movement of the key. The strike portion 320 is connected to the touch portion 316 and moves along with the touch portion 316 to strike the plate 114 and cause the acoustic signal. The strike portion 320 is cone shaped and has a pointed end that strikes the plate 114. The touch portion 316 and the strike portion 320 may be made of the same material or different materials. The strike portion 320 may be made of a solid material to cause an acoustic sound when the strike portion 320 strikes the plate 114.

FIG. 3B is a sectional view of the keypad 115 of the APR system 100 when a key 132B is pressed, according to one embodiment. When the key 132B is pressed, the key 132B moves vertically for a distance "t" and as a result, the strike portion of the key 132B strikes the plate 114. The striking of the key 132B causes an acoustic signal that propagates to the sensors 110A, 110B.

After the force pressing the key 132B is removed, the key 132B moves back up to a raised position as illustrate in FIG. 3A due to the resilience of the resilient cover 128.

FIG. 4 is a conceptual diagram illustrating the relationship between a region S1 of a key 132 that can be touched and a contact region S2 on the surface of the plate 114 where an acoustic signal can be generated, according to one embodiment. That is, the region S1 represents an upper surface of a key 132 that can be touched by a finger or a thumb. The region S2 represents a contact region of the plate 114 that can come in contact with the key 132 and generate the acoustic signal. As illustrated in FIG. 4, the region S2 is smaller than the region S1, which indicates that the acoustic signal will be generated in a smaller region of the plate 114 by using the key 132.

As the region S2 becomes smaller, the variation in the generated acoustic signal is likely to be diminished and more accurate sensing of the pressed key can be made the processing module 122. However, repeated striking of the smaller region of the plate 114 by the key 132 can increase wear and tear on the part of the plate 114 and the key 132. Hence, the increased accuracy due to a smaller size of the region S2 may be balanced with the reduced lifespan of the plate 114 and the key 132 due to repeated striking of the key 132 on the smaller region S2.

The keypad or keys arranged in the keypad may be of various configurations. FIG. 5 is a sectional diagram illustrating a structure of a key 500 according to another embodiment. The key 500 also includes two portions: a touch portion 510 (having a width of L1) and a strike portion 520 (having a width of L2) below the touch portion 510. The key 500 is shaped substantially the same as the key 132 of FIGS. 3A and 3B except that the strike portion 520 is frustoconical shaped and has a wider bottom portion. Since the strike portion 520 is wider, and the striking region on the plate is correspondingly larger, the key 500 and the plate are likely to have a longer lifespan compared to the key 132 of FIGS. 3A and 3B. The touch portion 510 may be shaped as a cube or a cylinder.

Figure 6A:
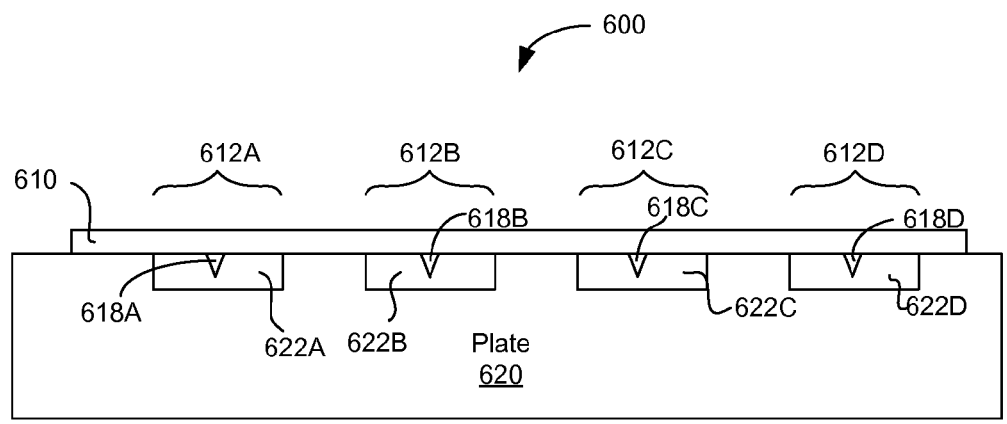
FIG. 6A is a sectional view of a keypad of an APR system when no key is pressed, according to another embodiment.

FIG. 6A is a sectional view of a keypad 600 of an APR system when no key is pressed, according to another embodiment. The keypad 600 is different from the keypad 115 in that strike portions 618A through 618D of keys 612A through 612D are secured to a bottom surface of a flexible film 610. A plate 620 is formed with recesses 622A through 622D to create space in which the striking portions 618A through 618D can be placed. The flexible film 610 is bonded to the plate 620 at portions where the recesses 618A through 618D are not formed but not at portions where the recesses 618A through 618D are formed. Each of the striking portions 618A through 618D is secured to a bottom surface of the flexible film 610.

Figure 6B:
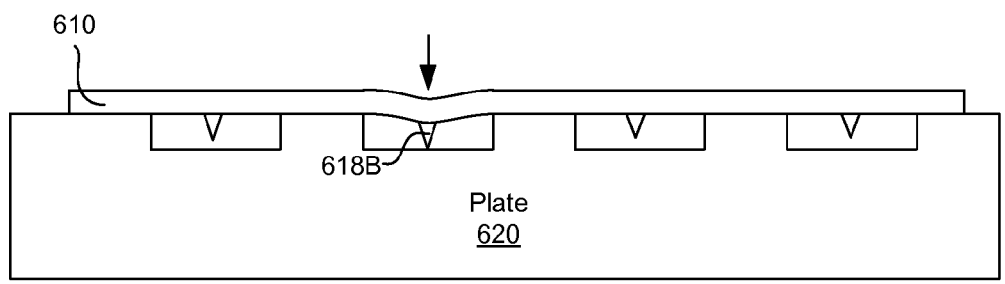
FIG. 6B is a sectional view of the keypad of FIG. 6A when a key is pressed, according to one embodiment.

FIG. 6B is a sectional view of the keypad 600 of FIG. 6A when the key 612B is pressed, according to one embodiment. As the key 612B is pressed (i.e., when the upper surface of the flexible film 610 is pressed), the striking portion 618B moves towards the plate 620 and strikes the surface of the plate 620. The string of the plate 620 generates an acoustic signal that can be detected by sensors and processed by a processing module.

After the pressing force of the key 612B is removed, the resilience of the flexible film 610 and the striking portion 618B revert back to the position as illustrated in FIG. 6A.

Embodiments of keypads described above with reference to FIGS. 3 through 6B are merely illustrative. Various other structures of keypads may be used to generate acoustic signals after pressing of a key and revert to a previous position after the pressing force to the key is removed.

Example Process of Detecting Touch of Keys

Figure 7:
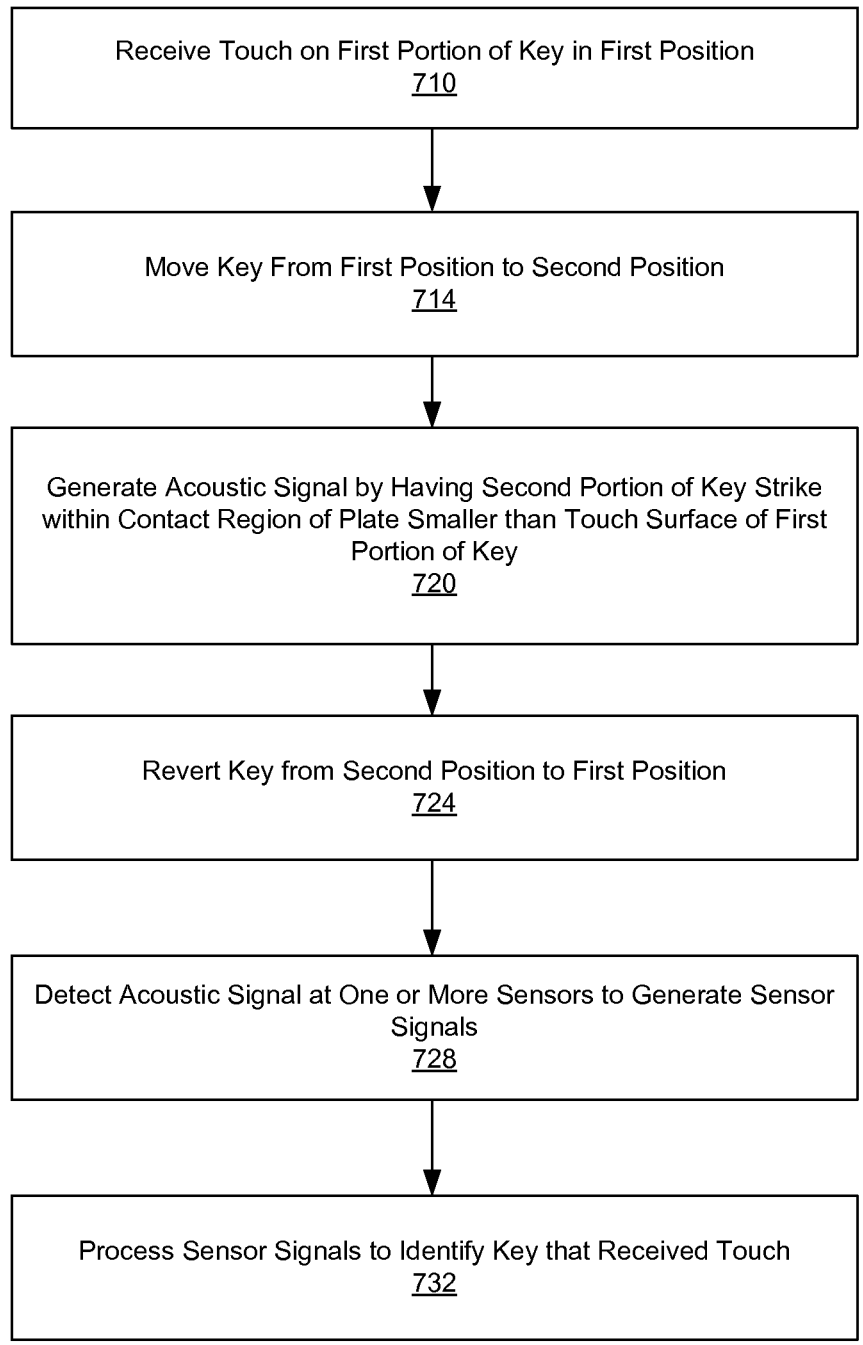
FIG. 7 is a flowchart illustrating a method of determining a user input, according to one embodiment.

FIG. 7 is a flowchart illustrating a method of determining a user input using APR, according to one embodiment. A key receives 710 touch from a user on a first portion (e.g., touch portion) in a first position (e.g., a raised position as illustrated in FIG. 3A). After receiving the touch, the key moves 714 vertically from the first position to a second position (e.g., a lowered position of key 132B, as illustrated in FIG. 3B).

An acoustic signal is generated 720 by having a second portion (e.g., strike portion) of the key strike a plate within a contact region of the plate smaller than the touch surface (e.g., a top surface) of the first portion of the key. Since the contact region of the plate generating the acoustic signal is smaller than the touch surface, the acoustic signals generated in response to pressing the same key include less variance, and hence, a more accurate determination can be made as to which key was pressed by analysing the acoustic signals.

After striking the plate, the key is reverted 724 from the second position to the first position, for example, by the resilient cover or other recovery mechanisms.

One or more sensor detect 728 the acoustic signal resulting from striking of the key and convert the acoustic signal into sensor signals. The electric sensor signals are communicated to the processing module 122.

The processing module 122 processes 732 the sensor signals to identify the key that was pressed. The processing includes amplification, filtering and digitizing of the sensor signals followed by comparing the digitized sensor signals with reference signals for each key stored in the APR system.

The process illustrated with reference to FIG. 7 is merely illustrative. The sequence of the process can be changed or some sequences may be performed in parallel. For example, the key may be moved 714 in parallel with generating 720 of the acoustic signal. Further, reverting 724 the key from the second position to the first position may be performed after detecting 728 the acoustic signal at one or more sensors.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Accordingly, the disclosure of the present invention is intended to be illustrative, but not limiting, of the scope of the present invention, which is set forth in the following claims.

The invention claimed is:

1. A user input device using acoustic pulse recognition, comprising:
   a plate;
   a plurality of keys, each key comprising:
      a first portion comprising a touch surface configured to receive a touch from a user in a first position and a bottom surface at an opposite side of the touch surface, and
      a striking portion connected to the first portion and coming into contact with a contact region of the plate in a second position to generate an acoustic signal responsive to receiving the touch, the contact region smaller than the touch surface;
   a resilient cover placed on the plate below the plurality of keys to cover portions of plate below the plurality of keys except contact regions of the plate, the resilient cover having a bottom surface contacting the plate and having bumps extending upwards from the bottom surface to contact bottom surfaces of first portions of the plurality of keys to support the plurality of keys in the first position, the resilient cover causing a key touched by the user to revert from the second position to the first position by resilience of the resilient cover;
   at least one sensor configured to generated a sensor signal responsive to receiving the acoustic signal; and
   a processing module configured to determine touching of one of the plurality of keys by processing the sensor signal.

2. The user input device of claim 1, wherein the processing module is configured to process the sensor signal by comparing the received sensor signal with a plurality of stored reference signals.

3. The user interface device of claim 2, wherein the processing module comprises an amplifier coupled to the at least one sensor to amplify the sensor signal, a filter to remove noise from the amplified sensor signal, and an analog-to-digital converter for converting the amplified sensor signal into a digital signal.

4. The user input device of claim 1, wherein the strike portion is cone shaped or frustoconical shaped.

5. The user input device of claim 1, wherein the at least one sensor comprises a first sensor oriented in a first direction and a second sensor oriented in a second direction perpendicular to the first direction.

* * * * *